UNITED STATES PATENT OFFICE.

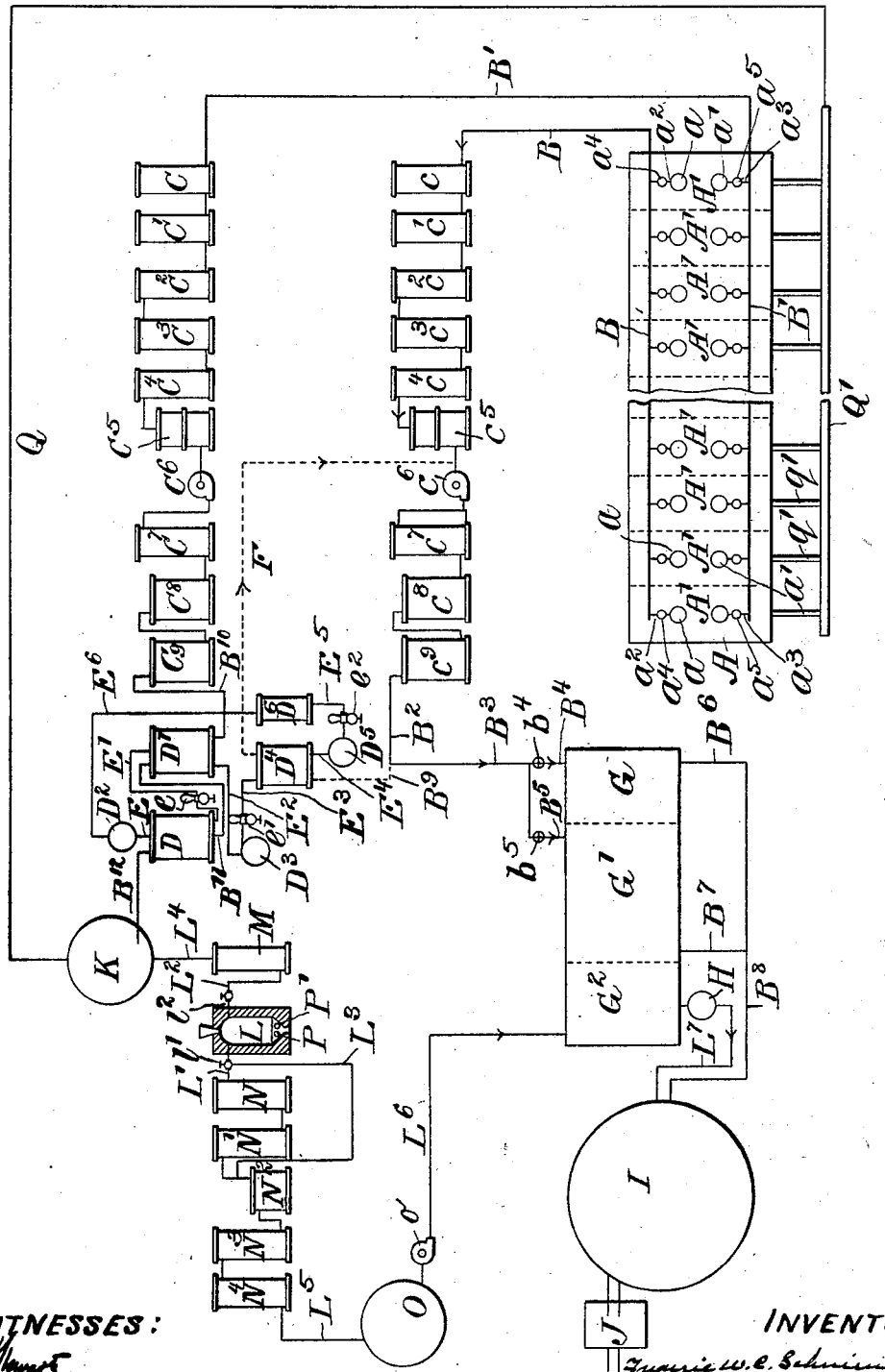

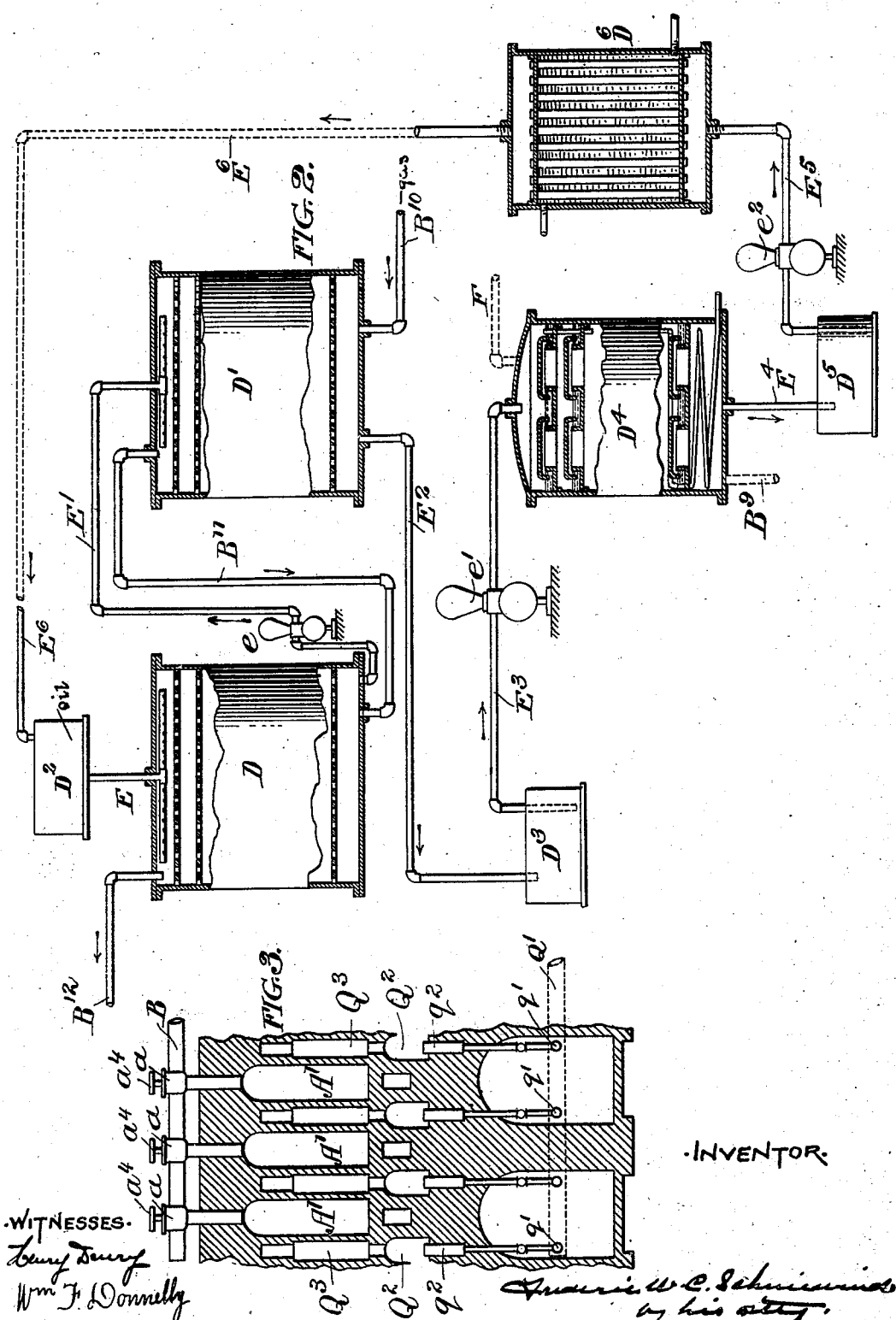

FREDERIC WILLIAM CHARLES SCHNIEWIND, OF NEW YORK, N. Y., ASSIGNOR TO THE UNITED COKE & GAS COMPANY, OF CHARLESTON, WEST VIRGINIA, AND PHILADELPHIA, PENNSYLVANIA, A CORPORATION OF WEST VIRGINIA.

METHOD OF MANUFACTURING GAS.

SPECIFICATION forming part of Letters Patent No. 698,062, dated April 22, 1902.

Application filed August 29, 1900. Serial No. 28,390. (No specimens.)

*To all whom it may concern:*

Be it known that I, FREDERIC WILLIAM CHARLES SCHNIEWIND, a citizen of the United States of America, residing in the city, county, and State of New York, have invented a certain new and useful Improvement in Methods of Manufacturing Gas, of which the following is a true and exact description, reference being had to the accompanying drawings, which form a part thereof.

My invention relates to the manufacture of illuminating-gas, and has for its object the production of illuminating-gas of high candle-power and of general good quality at low cost.

In my former application, filed January 8, 1900, Serial No. 653, I have described a method of manufacturing gas in which carbonaceous material is treated in externally-heated retorts and the gases of dry distillation thus produced separated into two portions, one of which, preferably that poorer in illuminants, is treated for the extraction of its illuminants— to wit, chiefly benzole $C_6H_6$ and its homologues, and ethylene $C_2H_4$ and its homologues—said illuminants being then mixed with the untreated portion in order to increase its illuminating value. As most usefully applied this process is used in connection with coke-ovens heated by a gas-furnace, the gas treated for extraction of these illuminants being used to heat said furnaces. In such or similar modes of application the theoretically-possible efficiency of the process is necessarily modified by the requirements of the gas-furnaces, a certain percentage of the gas being imperatively required to maintain the distillation process. Under certain conditions and in treating certain coals there is therefore a surplus of illuminants over that necessary to raise the enriched portion of the gas to a standard of desirable illuminant value. Again, where my said process is carried out with the best efficiency, the richer and poorer gases being separated and the poorer gases only treated for extraction of their illuminants, the rich portion of the gas may contain an undue percentage of sulfurous impurities, because the sulfurous compounds which contaminate the gas are given off most freely during the earlier stages of distillation. This is detrimental, because it is necessary that sulfur compounds above certain small percentages should be removed from the gas and the process of removal is expensive.

The particular objects of my invention are, in the first place, to provide for an additional supply of gas of low cost and of proper character to be mixed with the enriched portion of the gas, so that the total volume of illuminating-gas may be provided equivalent to the amount of illuminants available. In the second place, my object is to provide not only for the increase in volume of the illuminating-gas, but for a diminution of the percentage of sulfurous impurities in the gas, so as to diminish the cost of purification; and, in the third place, my object is to provide a volume of cheap fuel-gas for admixture with a portion of the gas produced by distillation, which is available for heating the gas-furnaces, thus obviously increasing the portion of gas available for illuminating purposes.

To effect the above purposes, I provide, in connection with an apparatus for manufacturing gas by dry distillation and for treating a portion of said gas to extract its illuminants and mix them with the untreated portion, a water-gas generator in which ignited carbonaceous material can be treated alternately with blasts of air and steam, so as to produce alternate volumes of producer-gas and water-gas. The water-gas produced I mix with the enriched gas of distillation, and the producer-gas I mix with a portion of the distillation-gases which have been robbed of their illuminants, so as to increase the volume of this gas, which is available for heating the retorts, my invention, generally speaking, consisting in treating carbonaceous material for the production of the gases of dry distillation, dividing said gases into two portions, preferably of unequal illuminating value, treating one portion, preferably the poorer one, for the extraction of its illuminants, and mixing said illuminants with the untreated portion of gas, subjecting another body of carbonaceous material to treatment in order to produce water-gas, and mixing said water-gas with the enriched gas of distillation in order to increase the volume of such gases and diminish their contained sulfurous impurities.

My invention further consists in the utilization of the producer-gas produced alternately with the water-gas for admixture with the gas from which the illuminants have been extracted and the use of such gas for heating the retorts in which the gas of dry distillation is produced.

Reference is had to the drawings, which illustrate diagrammatically a plant adopted for carrying on my process, in which—

Figure 1 is a general diagrammatic view of such a plant; Fig. 2, an enlarged partly-sectional view of a portion of the plant, and Fig. 3 a sectional view of a bank of ovens adapted for use in producing gas.

A indicates a bank of coke-ovens; A', &c., individual ovens of the bank. As shown, each oven is provided with two gas-outlet openings, (indicated at $a$ and $a'$,) said openings connecting, respectively, by pipes (indicated at $a^2 a^3$) with mains, (indicated at B and B',) $a^4$ and $a^5$ indicating the valves by which either of the pipes $a^2$ or $a^3$ can be closed at will. In practice during the first portion of the coking period in each of the ovens and while the gases most rich in illuminants are being given off from the coal the valves $a^4$ are opened and the valves $a^5$ closed, so that this rich gas is delivered into the main B. During the later period of the coking process, when the poorer gases are produced, the valves $a^4$ are closed and the valves $a^5$ are opened, so that the poorer gases are delivered into the main B', the rich gas in the main B then being passed through a condensing-house, comprising, as shown, separate washers, (indicated at $c\ c'$,) coolers, (indicated at $c^2 c^3 c^4$,) a tar-scrubber, (indicated at $c^5$,) an exhauster, (indicated at $c^6$,) a cooler, (indicated at $c^7$,) bell-washers, (indicated at $c^8 c^9$,) passing thence through a main (indicated at $B^2 B^3$) into either or both of the divisions $B^4 B^5$, controlled by valves $b^4$ and $b^5$ and leading, respectively, to the purifying-chambers G G'. The poorer division of the gases passing through the main B' also passes through a similar condensing apparatus (indicated at C and $C^9$, inclusive) and thence passes through the main $B^{10}$ to the benzole-scrubber, (indicated at D',) thence through the pipe $B^{11}$ to the second benzole-scrubber, (indicated at D,) and thence through the pipe $B^{12}$ to the reservoir K. As shown, (see Fig. 2,) the benzole-scrubbers D and D' are fitted up with a multiple series of transverse perforated partitions, through which the gases rise, coming in contact with the circulating body of oil capable of absorbing illuminants, which, coming from a reservoir $D^2$, passes into the scrubber D through the pipe E, having a spray-terminal, as shown, the oil being drawn from the bottom of the scrubber D by the pump $e$, situated in the conduit E', which has a spray-terminal in the head of the second scrubber D', from the bottom of which scrubber the pipe $E^2$ leads the oil to a reservoir $D^3$, from which it is drawn by a pump $e'$ through a pipe $E^3$, leading into the top of a still, (indicated at $D^4$,) in which the illuminants are driven off through the pipe F, while the oil freed from a greater portion of the illuminants is delivered through the pipe $E^4$ into the reservoir $D^5$, a pump $e^2$ raising the oil from said reservoir and forcing it into a pipe $E^5$ and to a cooler $D^6$ and thence through a pipe $E^6$ into the reservoir $D^2$. In order to facilitate the operation of distilling off illuminants from the absorbent oil, I prefer to pass a certain amount of gas through the still $D^4$, $B^9$ indicating a pipe leading from the gas-main $B^2$ into the still $D^4$ for this purpose. As shown and as preferably practiced by me, the illuminants driven off in the still $D^4$ are conducted by the pipe F to a point in the condensing apparatus for the rich gas on the suction side of the exhauster $c^6$, so that the said illuminants are subjected in admixture with the rich gas to the condensing operation performed in the receptacles $c^7 c^8 c^9$. The oil I prefer to use for extracting illuminants from the gas is one produced by the fractional distillation of coal-tar and boiling between 200° and 300° centigrade.

L, Fig. 1, indicates a water-gas producer, P and P' indicating, respectively, air and steam supply pipes, L' indicating the gas-delivery pipe for the water-gas, and $L^2$ a delivery-pipe for the producer-gas, $l'$ and $l^2$ indicating valves for controlling these delivery-pipes.

M indicates a scrubber for producer-gas, and $L^4$ a conduit connecting the scrubber with the reservoir K.

The delivery-pipe L' for the water-gas connects, as shown, either with a superheating carbureting plant, (indicated at N N' $N^2 N^3 N^4$,) $N^2$ indicating a scrubber, and $N^3 N^4$ condensers, and thence through the pipe $L^5$ with the relief-holder O, or, in the alternative, with the pipe $L^3$, leading through the scrubber and condenser to the relief-holder without passing through the superheating and carbureting chambers N N'. In ordinary operation it will not be necessary or desirable to carburet the water-gas, though under certain conditions it will be exceedingly valuable to have the carbureting plant available. From the relief-holder O the water-gas is drawn by an exhauster $o$ and forced through a pipe $L^6$ into the purifying-chamber $G^2$, containing oxid-boxes only, as only sulfureted hydrogen is to be removed, passing thence through a pipe $L^7$, which, as shown, has a meter attachment, (indicated at H,) into the reservoir I, where it mixes with the enriched gases of distillation, which, passing either through the purifying-chambers G' or G, is carried off by the pipes $B^7$ and $B^6$ to a common pipe $B^8$, leading to the reservoir I. In practice chamber G contains only oxid-boxes, while chamber G' embodies a complete purifying plant adapted to remove organic sulfur compounds and carbonic acid.

J indicates a meter-house in the delivery-main leading from the reservoir I.

Q is a gas-pipe leading from the reservoir K and connecting through a common distribution-pipe Q' with a series of burner-pipes $q'$, having burners $q^2$ (see Fig. 3) opening into the gas-furnaces, (indicated at $Q^2$ and $Q^3$.)

The operation of the above-described apparatus in carrying my process into effect needs but little additional explanation. The ovens A' are charged with bituminous coal and heated through the furnaces $Q^2$ $Q^3$ by gases issuing from the burners $q^2$ and drawn from the reservoir K. Those ovens giving off rich gases are connected with the main B and those giving off poor gases with the main B'. The poor gas after being treated in the condensing-house is treated with oil in order to extract from it its illuminants in the scrubbers D and D', the residual gas being delivered into the reservoir K. The oil carrying the absorbed illuminants is subjected to distillation in the still $D^4$ and the vaporized illuminants conducted from said still through the pipe F and mixed with the rich gas, preferably, as shown in the condensing system through which said gases are passed, the enriched gas passing in regulable degrees through the purifying-chambers G' and G in accordance with the percentage of sulfur compounds which it is desired to remove from the gas and then being collected in the reservoir I. At the same time the water-gas generator L is subjected to alternate blasts of air and steam, the producer-gas generated while the air-blast is on being scrubbed at M and then mixed with the poor gas from the ovens in the reservoir K. The water-gas generated while the steam-blast is on is, as shown, first cooled and then conducted to the relief-holder O and then through the purifying-chamber $G^2$ to the reservoir I, where it is mixed with the enriched gas from the ovens. If desired, the water-gas can be carbureted in the apparatus indicated at N N', though, as I have stated, this is not generally advisable.

While my present application is directed solely to the method of manufacturing gas described, I would state that the plant illustrated is also my invention and forms the subject-matter of my other application for Letters Patent, filed August 29, 1900, Serial No. 28,391.

While, as stated, my process is chiefly directed to a treatment in which the portion of the coke-oven gases saved for use as illuminating-gas is enriched by the illuminants absorbed from the portion of said gases used for heating the ovens, useful results are obtained without the transfer of illuminants by mixing the blue water-gas with the portion of retort-gas separated as illuminating-gas, so as to increase its volume and diminish its sulfur percentage and the producer-gas with the other portion of retort-gas used for heating the retorts, so as to increase its volume and enable a larger portion of retort-gas to be utilized as illuminating-gas, and this treatment I believe to be new with me and desire to protect.

Having now described my invention, what I claim as new, and desire to secure by Letters Patent, is—

1. The method of manufacturing gas which consists in subjecting carbonaceous material to dry distillation, separating the gases thus produced into two portions, extracting the illuminants from one divided portion and mixing said illuminants with the other portion in order to enrich it, treating another body of carbonaceous material to produce water-gas and mixing said water-gas with the enriched portion of the gas produced by distillation in order to increase its volume and diminish its percentage of sulfurous impurities.

2. The method of manufacturing gas which consists in subjecting carbonaceous material to dry distillation, separating the gas thus produced into two portions, treating another body of carbonaceous material alternately with blasts of air and steam to produce producer and water gas, mixing said water-gas with the enriched portion of the gas produced by distillation in order to increase its volume and diminish its percentage of sulfurous impurities, mixing the producer-gas with a portion of the gas robbed of its illuminants and using said last-mentioned gases for the distillation of the carbonaceous material.

3. The method of manufacturing gas which consists in subjecting carbonaceous material to dry distillation, separating the gas thus produced into two portions, extracting the illuminants from one divided portion and mixing said illuminants with the other portion in order to enrich it, treating another body of carbonaceous material alternately with blasts of air and steam to produce producer and water gas, mixing said water gas with the enriched portion of the gas produced by distillation in order to increase its volume and diminish its percentage of sulfurous impurities, mixing the producer-gas with a portion of the gas robbed of its illuminants and using said last-mentioned gases for the distillation of the carbonaceous material.

4. The method of manufacturing gas which consists in subjecting carbonaceous material to dry distillation to drive off its gases, separating the richer and poorer gases produced, treating the poorer portion of gas to extract its contained illuminants, mixing said extracted illuminants with the richer division of the gas to enrich it, treating another body of carbonaceous material for the manufacture of water-gas and mixing said water-gas with the enriched gas to increase its volume and diminish its percentage of contained sulfurous compounds.

5. The method of manufacturing gas which consists in subjecting carbonaceous material to dry distillation to drive off its gases, separating the richer and poorer gases produced, treating the poorer portion of gas to extract its contained illuminants, mixing said extracted illuminants with the richer division of the gas to enrich it, treating another body of carbonaceous material with alternate blasts of air and steam for the manufacture of producer and water gas, mixing said water-gas with the enriched gas to increase its volume and diminish its percentage of contained sulfur compounds, mixing the producer-gas with the poorer division of the gas distillate, and using said last-mentioned mixture for the distillation of the carbonaceous material.

FREDERIC WILLIAM CHARLES SCHNIEWIND.

Witnesses:
 D. W. KINCAID,
 M. A. GOEKS.